APPARATUS FOR READING OUT INFORMATION PUNCHED INTO TAPES OR CARDS

Filed Feb. 7, 1966

United States Patent Office 3,525,855

Patented Aug. 25, 1970

3,525,855

APPARATUS FOR READING OUT INFORMATION PUNCHED INTO TAPES OR CARDS

Nobuhiro Azuma, Tokyo-to, Japan, assignor to Kokusai Denshin Denwa Kabushiki Kaisha, Tokyo-to, Japan Filed Feb. 7, 1966, Ser. No. 525,415
Claims priority, application Japan, Feb. 8, 1965, 40/6,693
Int. Cl. G06k *7/00;* G11b *23/00*
U.S. Cl. 235—61.11 1 Claim

ABSTRACT OF THE DISCLOSURE

Apparatus for reading out information punched into a tape or card transported along a guide path passing between a common contactor and a plurality of row contacts, where the common contactor is a slightly resilient pad of carbon fibers and has a flat surface to uniformly contact the contact surface of the tape or card so that the information punched is reliably read out through contact circuits formed by the common contact and the row contacts, since the vibration energy of each of the arms of the row contacts is absorbed by the slight resiliency of the common contactor and a number of carbon fibers raised on the common contactor contact stably with the row contacts at each of the perforations punched on the tape or card.

This invention relates to apparatus for reading out information punched into a flat strip of insulating material having a substantially constant width and more particularly to apparatus for reading out information punched into tapes or cards.

In the prior art, there have been proposed many kinds of tape readers or card readers such as mechanical readers using tape pins or brushes or a photoelectric converter. In mechanical readers using tape pins, the punched tape cannot be transported at a very high speed since the tape must be stopped at each instant of reading out. Mechanical readers using brushes also have disadvantages such as limitation of the unidirectional traveling direction of the punched tape and loose contact due to waste fibers around the punched holes. Moreover, photoelectric readers are complicated and high priced although such devices can be operated at high speed.

An object of this invention is to provide an economical reading apparatus for punched tapes or punched cards operable at high speed with high reliability.

Another object of this invention is to provide a reading apparatus capable of transporting, in dual directions, punched tapes or cards to be read out.

According to this invention there is provided an apparatus for reading out information punched into a flat strip of insulating material having a substantially constant width, comprising guide means for guiding the strip along a guide path, means for transporting the strip along the guide path, a common contact member mounted at one side of the guide path so as to face the contact face of the strip travelling along the guide path, the common contactor being a conductive pad of carbon fibers and having a flat surface to be in uniform contact with the contact face of the strip, and a plurality of contactors each comprising a conductive arm of spring metal and a contact disposed at the free end of the arm, said contactors being mounted side by side so that contacts are placed in a row and in contact with the flat surface of the common contact member, spaces between adjacent contacts being substantially equal to respective spaces between centers of adjacent holes of the strip which holes are punched in alignment in the direction perpendicular to the travelling direction of the strip, whereby when the strip is transported along the guide path passing between the contacts and the flat surface of the common contact member, information punched into the strip is read out, for each row of punched holes, as closing or opening of contact circuits which are composed of the common contact member and said plurality of contactors, respectively.

The novel features of this invention are set forth with particularly in the appended claim. This invention, however, as to its construction and operation together with advantages thereof, may best be understood by reference to the following description, taken in connection with the accompanying drawings in which the same or equivalent parts are designated by the same or similar reference numerals or characters, and in which:

FIG. 1 is a schematic perspective view of an embodiment of this invention applied to read out of a punched tape;

FIGS. 2 and 3(*a*) are schematic elevational views of embodiments of this invention applied to read out of a punched tape;

FIG. 3(*b*) is a schematic plan view of an embodiment of this invention applied to read out of a punched tape;

Figures 1, 2, 3A, 3B, 4A, 4B, 4C, 5, 6:
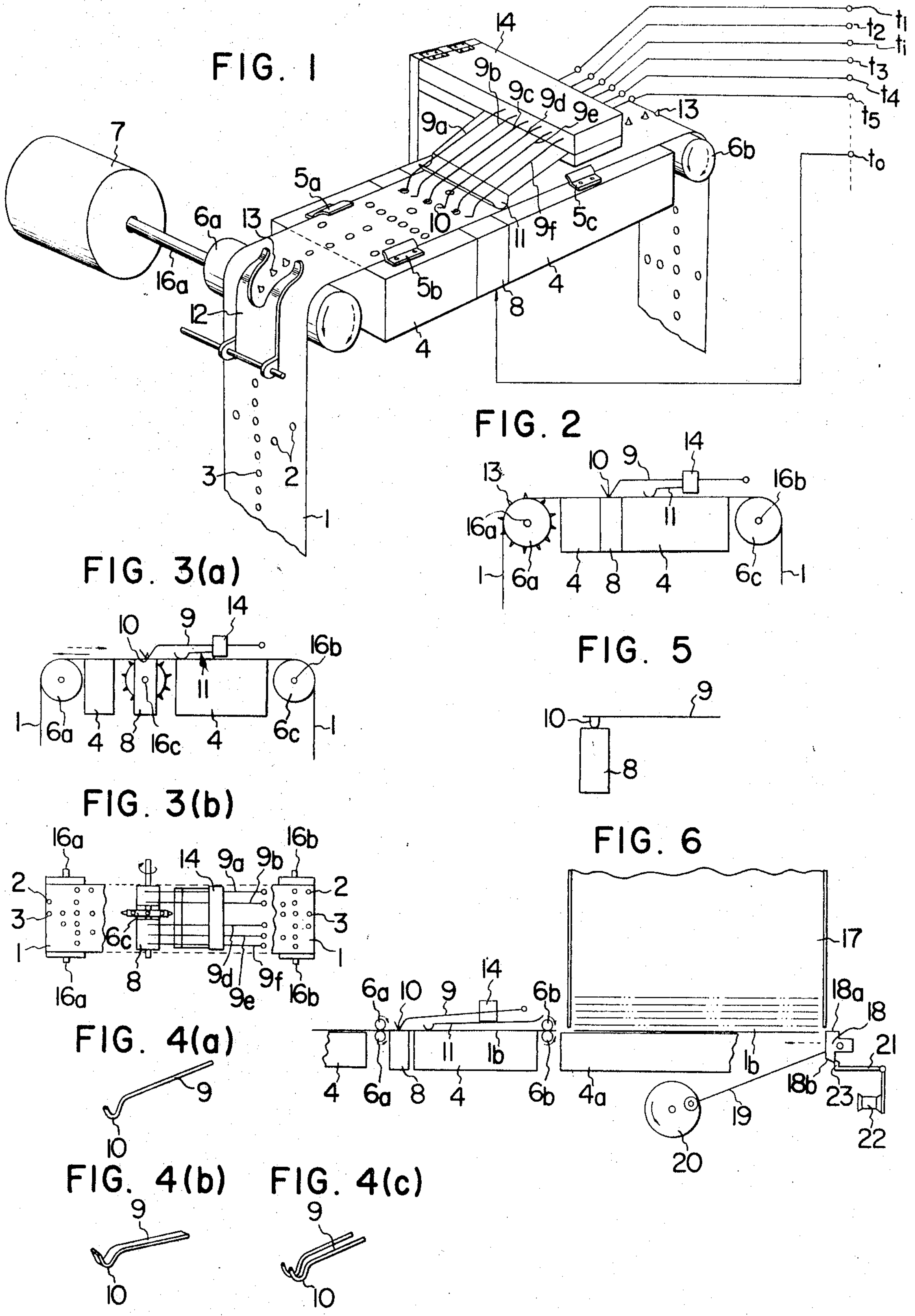

FIGS. 4(*a*), 4(*b*) and 4(*c*) are fragmental perspective views of contactors of apparatus in accordance with this invention;

FIG. 5 is a fragmental elevational view of a contactor; and

FIG. 6 is a schematic elevational view of an embodiment of this invention applied to read out of a punched card.

Referring to FIG. 1, the construction of the reader of this invention applicable to read out of a punched tape 1 will be first described. In FIG. 1, there is shown a 6-hole paper tape for transmitting characters each indicative of a 5-unit code. In a conventional telegraph system, holes 2 are employed for indicating binary information of code elements and holes 3 are employed for controlling the starting and stopping of the transporting operation of the tape. However, holes 3 can also be employed as binary information when the reader of this invention is applied as described below.

The reader of this invention comprises guide means, transporting means, a common contact member and a plurality of contactors. The guide means is composed of a mounting bed 4, guide plates **5*a*, 5*b* and 5*c* . . . mounted on the base 4, a guide plate 11 mounted on a holder of insulation material 14, and, if necessary, teeth 13 of a sprocket wheel 6*a* (and/or 6*b*). According to the guide means, a guide path for transporting the tape is established. The transporting means is composed of the sprocket wheel 6*a* driven by a motor 7 through a shaft 16*a***.

The contact circuits of the reader have characteristic features according to this invention. One component of the contact circuits is a common contact member in the form of a conductive fiber pad 8 which is made of flexible conductive fibers such as carbon fibers or graphite fibers. These fibers are obtained, for example from polyacrylonitrile fiber, through carbonization and/or graphitization of the raw fiber by heat treatment thereof. One example of this conductive fiber pad is "Carbolon" (trademark). This fiber pad has a flat surface to uniformly contact the contact surface of the tape and is mounted on the base 4 to be employed as a common slightly resilient contact member.

Another component of the contact circuits is a plurality of contactors **9*a*, 9*b*, 9*c*, 9*d*,9*e* and 9*f*. Each of these contactors is composed of a conductive arm 9 of spring metal and a contact 10 disposed at the tip of the arm. The contactors 9*a*, 9*b*, 9*c*, 9*d*, 9*e* and 9*f* are mounted side by side on the holder 14 so that the contacts 10 of these contactors are placed in a transverse row and contact the flat surface of the common contactor 8. Spaces between adjacent contacts 10 are substantially equal to respective spaces between centers of adjacent holes (2 and 3**) of the tape, which holes are punched in alignment in the direction perpendicular to the traveling direction of the tape.

In the reading apparatus of the arrangement and construction as described above, when the tape 1 is transported along the guide path passing between the contacts 10 and the flat surface of the common contact member 8, binary information punched into the tape 1 is read out, for each row of punched holes, as closing or opening of the contact circuits which are formed through the common contact member 8 and said plurality of contactors 9*a*, 9*b*, 9*c*, 9*d*, 9*e* and 9*f*, respectively. The binary information thus read out is derived through a common terminal $t_0$ and terminals $t_1$, $t_2$, $t_3$, $t_4$ and $t_5$ respectively corresponding to code elements.

In addition to the arrangement described with reference to FIG. 1, other arrangements such as that wherein the sprocket wheel 6*a* is provided at the outlet side only as shown in FIG. 2 or in the notch provided in the common contact member 8 as shown in FIG. 3(*a*) and 3(*b*) are possible.

With respect to construction of the contactors 9*a* . . . 9*f*, many modifications can be considered. In FIG. 4(*a*). the contactor 9 is composed of a spring wire with a circular cross section and the contact 10 is formed into a V shape, one end of the V being connected to the arm, whereby the contactor 9 is shaped like a "square root mark" ($\sqrt{\quad}$). In FIGS. 4(*b*) and 4(*c*), the contactor 9 is composed of a strip spring-wire and a plurality of spring wires having identical shapes. FIG. 5 shows the shape of a contactor 9 which has a contact 10 of a rounded projection. The above described shapes of the contact 10 permit transport of the punched tape 1 in dual directions shown in FIGS. 1 and 3(*a*) by a full-line arrow and a dotted-line arrow.

As described above, since the common contact member 8 is composed of a conductive fiber pad and has a little resiliency, each contact 10 contacts a number of fibers raised at the contact surface of the contactor 8, and contact circuits between the contact member 8 and the respective contacts 10 are therefore formed as a combination of "a plurality of point contacts" and "plane contact." Accordingly, even if insulative wastes, such as waste fibers, are adhering around any of the punched holes, stable contact can still be attained at each contact instant. As a result of this operation, reading of binary information punched into the tape 1 is performed with high reliability by the reader of this invention. Moreover, since the vibration energy of each of the spring arms caused at the contact instant is absorbed by the common contact member 8 which has a little resiliency, high speed reading can be carried out without disturbance due to chattering.

In FIG. 6 there is shown an embodiment of this invention applied to read out of binary information punched into a paper card 1*b*. The contact system of this embodiment is the same as that described above. In this embodiment, a number of cards 1*b* are loaded into a magazine 17. The loaded cards 1*b* are successively sent out horizontally from beneath the magazine 17 by means of a feed-knife mechanism which comprises, as known in the art, a carriage 18 holding two feed knives 18*a* and 18*b*, latch levers 21 to hold down knives 18*a* and 18*b*, operating magnets 22 to control the latch levers 21, a crank 20, and a connection rod 19 to cause the carriage

18 to reciprocate on a slide. Each of the knives 18*a* and 18*b* is pivoted independently at the right-hand side and controlled by knife latch interposers 23 situated below the knife carriage 18. The sent out card 1*b* is received by rollers 6*b* driven as shown by arrow sand then transported to the contact system and rollers 6*a*.

Since it is obvious that many changes and modifications can be made in the above described details without departing from the nature and spirit of the invention, it is to be understood that the invention is not to be limited to the details described herein except as set forth in the appended claim.

What I claim is:

1. An apparatus for reading out information punched as holes in a flat strip of nonconductive material having a substantially constant width, comprising guide means for guiding the strip along a guide path, means for transporting the strip along the guide path, a common contact member mounted at one side of the guide path so as to contact a face of said strip traveling along the guide path, the common contact member comprising a conductive resilient pad of carbon fibers and having a flat surface to uniformly contact said face of the strip, and a plurality of contactors each comprising a conductive arm of spring metal and a contact disposed at a free end of the arm, each of the plurality of contactors being composed of at least one spring wire of circular cross section, and the contact of each contactor being of V shape, one end of the V being connected to the arm of the contactor, whereby each contactor has the shape of a "square root sign" ($\sqrt{\quad}$), said contactors being mounted side-by-side in a row in position to contact the flat surface of the common contact member, spaces between adjacent contactors being substantially equal to respective spaces between centers of adjacent holes in the strip, said holes being disposed in alignment in a direction perpendicular to the direction of travel of the strip, whereby when the strip is transported along the guide path passing between the contactors and the flat surface of the common contact member, information punched into the strip is read out for each row of punched holes, as closing or opening of contact circuits which are composed of the common contact member and said plurality of contactors, respectively.

References Cited

UNITED STATES PATENTS

| | | | |
|---|---|---|---|
| 2,203,013 | 6/1940 | Ford | 235—61.111 |
| 2,265,462 | 12/1941 | Weitmann | 235—61.111 |
| 2,322,773 | 6/1943 | Peters | 174—120.2 |
| 2,357,490 | 9/1944 | Palmer et al. | 235—61.111 X |
| 2,562,179 | 7/1951 | Dorf | 235—61.111 |
| 2,843,319 | 7/1958 | Deutsch | 235—61.113 |
| 2,935,923 | 5/1960 | Baumbach et al. | 235—61.111 X |
| 3,024,983 | 3/1962 | Lapointe | 235—61.113 |
| 3,233,081 | 2/1966 | Charron | 235—61.113 |
| 3,350,546 | 10/1967 | Marjoram et al. | 235—61.113 |
| 3,200,240 | 8/1965 | Hammel | 235—61.11 |

FOREIGN PATENTS

| | | |
|---|---|---|
| 150,283 | 2/1953 | Australia. |

DARYL W. COOK, Primary Examiner

R. M. KILGORE, Assistant Examiner

U.S. Cl. X.R.

178—112